March 3, 1970     F. H. VAN WINSEN     3,498,631
WHEEL SUSPENSION FOR THE REAR WHEELS OF MOTOR VEHICLES
Filed March 9, 1967     2 Sheets-Sheet 1

INVENTOR
FRIEDRICH H. VAN WINSEN
BY *Licke + Craig*
ATTORNEYS

March 3, 1970     F. H. VAN WINSEN     3,498,631
WHEEL SUSPENSION FOR THE REAR WHEELS OF MOTOR VEHICLES
Filed March 9, 1967     2 Sheets-Sheet 2

INVENTOR
FRIEDRICH H. VAN WINSEN

BY *Dicke + Craig*
ATTORNEYS

United States Patent Office 3,498,631
Patented Mar. 3, 1970

3,498,631
WHEEL SUSPENSION FOR THE REAR WHEELS OF MOTOR VEHICLES
Friedrich H. van Winsen, Kirchheim unter Teck, Germany, assignor to Daimler-Benz Aktiengesellschaft, Stuttgart-Unterturkheim, Germany
Filed Mar. 9, 1967, Ser. No. 621,989
Claims priority, application Germany, Mar. 16, 1966, D 49,610
Int. Cl. B60g 3/14, 11/16
U.S. Cl. 280—124       23 Claims

ABSTRACT OF THE DISCLOSURE

A wheel suspension for the rear axle of motor vehicles in which the wheel carrier is suspended at the vehicle frame or the like by means of two substantially oppositely directed guide members of which one, in particular, the lower guide member is pivotally connected with both the frame and the wheel carrier about a cross axis but in such a manner as to be angle-stiff as viewed in plan view whereas the other guide member, especially the upper guide member, pivotally connects the wheel carrier with the vehicle frame or the like to provide universal pivotal movements in all directions, and in which the other guide member is yieldingly constructed or yieldingly supported primarily in the vehicle longitudinal direction; the other longitudinally yielding guide member also may be constructed in a telescopic manner to provide this yieldingness or may be supported at the vehicle frame or body so as to provide such yieldingness primarily in the longitudinal direction. Though various conventional guide members can be used with the present invention, the upper guide member is constructed in a preferred embodiment as a torsion rod stabilizer interconnecting the oppositely disposed wheels.

BACKGROUND OF THE INVENTION

The present invention relates to a wheel suspension for the rear axle of motor vehicles in which the wheel carrier is guided at the vehicle superstructure, such as the vehicle frame or vehicle body, by means of two oppositely directed guide members of which one guide member, especially the lower guide member, is pivotally connected with the vehicle superstructure, in particular on a wide base, as also with the wheel carrier about a cross axis but is connected therewith angle-stiff or corner rigid as viewed in plan view whereas the other guide member, in particular the upper guide member, supports the wheel carrier with respect to the vehicle superstructure to provide universal movement and is preferably constructed as torsion rod stabilizer operatively connecting the oppositely disposed wheels, as described in my prior U.S. Patent 3,277,975.

An accurate wheel guidance which is particularly suited for a stable road-holding property of the vehicle is achieved by the angle-stiff or corner-rigid connection, as viewed in plan view, of the wheel carrier with the one of the two guide members which itself is connected at the vehicle superstructure in a stable manner. The oppositely directed second guide member extending in the opposite direction therefore primarily serves to absorb, in conjunction with the first-mentioned guide member, thrust or pushing forces and torques about a cross axis of the vehicle. The universal pivotal connection of the guide member with the wheel carrier simultaneously assures an unconstrained wheel guidance avoiding undesirably large stresses during the spring deflections of the wheels.

It has additionally been proposed already in my aforementioned patent to provide in the joints of the second, universally connected guide member rubber bushings whereby a metallic transmission of shocks, which occur in the wheel suspension, from the wheel carrier to the vehicle superstructure is intercepted.

However, such a universal and elastic yieldingness does not suffice in many cases in order to achieve the desired driving comfort. On the other hand, the bushings cannot exceed a certain yieldingness if an undesirable instability of the vehicle body in relation to the wheels is to be avoided. This has, as a consequence, that above all shocks and impacts acting in the vehicle longitudinal direction can be absorbed only with a certain stiffness.

SUMMARY OF THE INVENTION

The present invention aims above all to avoid these disadvantages and to absorb particularly softly shocks and impacts acting in the longitudinal direction of the vehicle which stem from the road or occur during sudden braking or starting. Accordingly, the present invention essentially consists in that the guide member which supports the wheel carrier at the vehicle superstructure with universal pivotal movement, is constructed or supported yieldingly primarily in the vehicle longitudinal direction.

Thus, while the yieldingness in other directions is kept relatively slight, the yieldingness in the vehicle longitudinal direction may be increased to a multiple, for example, from 0.5 to 1 mm. up to approximately 10 to 15 mm. without thereby impairing the stability of the wheel suspension assured in particular by the other guide member.

The springy or elastic yieldingness of the guide member can be achieved by the telescopic construction thereof. However, it is particularly advantageous if elastic cushions such as rubber cushions are used for the springy yieldingness in the vehicle longitudinal direction. In particular, the bearing joint of the guide member may be secured at a supporting or supported vehicle part, especially at the vehicle superstructure, by means of one or several cushions or buffers of elastic, rubber-like material having a large yieldingness in the vehicle longitudinal direction and to be referred to hereinafter, for sake of simplicity, as rubber cushions though it is understood that other materials may be used therefor. Preferably, one rubber cushion each is arranged thereby in front and to the rear of the bearing joint, in particular in such a manner that the individual rubber cushion is freely deformable in shear in the vehicle longitudinal direction between a support surface at the vehicle superstructure and a support surface at the guide member or at the bearing joint thereof.

According to a particularly preferred embodiment of the present invention which absorbs the occurring forces particularly advantageously and permits a simple manufacture and assembly, the guide member of the wheel—in particular simultaneously constructed as torsion rod or connected with such a torsion rod—is supported for the pivotal support at the vehicle superstructure in a bearing piece which is secured at the vehicle superstructure in the vehicle longitudinal direction in front and to the rear of the bearing axis of the guide member by means of an annularly shaped rubber cushion, preferably having an axis perpendicular to the bearing axis.

Accordingly, it is an object of the present invention to provide a wheel suspension for the rear axle of a motor vehicle which avoids the aforementioned drawbacks and shortcomings encountered with the prior art construction by extremely simple means.

Another object of the present invention resides in a rear alxle suspension for motor vehicles which considerably improves the driving comfort.

A further object of the present invention resides in a rear axle wheel suspension for motor vehicles which improves the capability of the wheel suspension to absorb shocks and impacts in the longitudinal direction without, however, impairing the stability of the wheel suspension.

Still another object of the present invention resides in a wheel suspension for the rear axles of motor vehicles which greatly increases the yieldingness of the suspension in the vehicle longitudinal direction without substantially affecting the spring stiffness and yieldingness in other directions.

These and other objects, features, and advantages of the present invention will become more obvious from the following description when taken in connection with the accompanying drawing, which shows, for purposes of illustration only, several embodiments in accordance with the present invention, and wherein.

Figure 1:
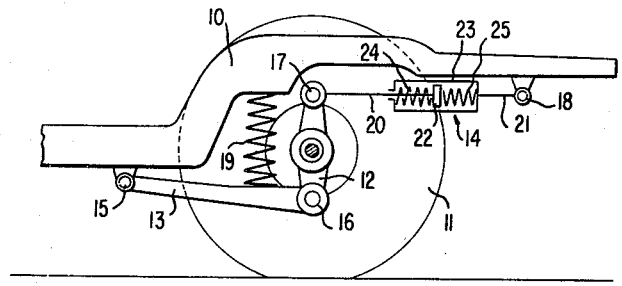
FIGURE 1 is a somewhat schematic, partial side elevational view of a wheel suspension in accordance with the present invention having a guide member yielding in the longitudinal direction.

Referring now to the drawing wherein like reference numerals are used throughout the various views to designate like parts, and more particularly to FIGURE 1, reference numeral 10 designates therein the vehicle superstructure, for example, the frame of a motor vehicle while reference numeral 11 designates therein one of the two rear wheels of the motor vehicle. The wheel carrier 12 is suspended at the vehicle superstructure 10 by means of the two guide members generally designated by reference numerals 13 and 14 whereby the guide member 13 extends as lower guide member in the forward direction from the wheel 11 and is supported in a hinge joint 15 at the vehicle superstructure 10 in an angle-stiff or corner-rigid manner, as viewed in plan view. The lower guide member 13 is pivotally connected with the wheel carrier 12 about a vehicle cross axis by means of joint 16 of conventional construction but—as disclosed in the aforementioned patent—in an angle-stiff or corner-rigid manner, as viewed in plan view, so that the wheel carrier 12 together with the wheel 11 receives an unequivocal, stable guidance in the vehicle transverse direction as well as about a vertical axis by means of the guide member 13.

The guide member 14 serving for the upper support of the wheel carrier 12 with respect to the vehicle superstructure 10 is connected by means of a universal joint 17 with the wheel carrier 12 and by means of a joint 18, for example, also a universal joint, with the vehicle superstructure 10 in such a manner that the guide member 14 is able to follow unconstrainedly the movements of the wheel carirer 12 determined by the lower guide member 13. A spring, for example, a coil spring 19 spring-supports the wheel carrier 12 or the wheel with respect to the vehicle superstructure 10. A conventional shock absorber may be combined with the spring 19. Additionally, rubber bushings or the like may be provided in the joints 15 and 16 as well as in the joints 17 and 18 in order to prevent above all a metallic shock transmission from the wheel 11 to the vehicle superstructure 10.

Additionally, the upper guide member 14 which extends rearwardly from the wheel 11, is constructed according to the present invention elastically in its longitudinal direction or in the vehicle longitudinal direction. This is schematically illustrated in FIGURE 1 in that the guide member 14 consists telescopically of two parts 20 and 21 of which the part 20 includes a piston 22 and the part 21 a cylinder 23, within which the piston 22 is slidingly guided in the longitudinal direction and is kept in a center position by means of the two springs 24 and 25.

If impacts or shocks occur in the vehicle longitudinal direction which stem, for example, from the road or from braking or sudden starting, the guide member 14 may shorten or lengthen itself and may thereby absorb the shock before it is transmitted by way of the joint 18 to the vehicle superstructure 10. After the cessation of the shock or impact action, the guide member 14 can return again to its center rest position.

Possibly, the springs 24 and 25 may be supported in the illustrated center position against abutments and may be under prestress so that with occurring shocks or impacts the piston 22 is able to lift the springs off from the abutments thereof only upon reaching a predetermined shock or impact force. Also, the springs 24 and 25 may be replaced by conventional rubber cushions or buffers or similar elastic elements; the guide member 14 may also be constructed in any other suitable manner as guide member yielding in its longitudinal direction.

Figure 2:
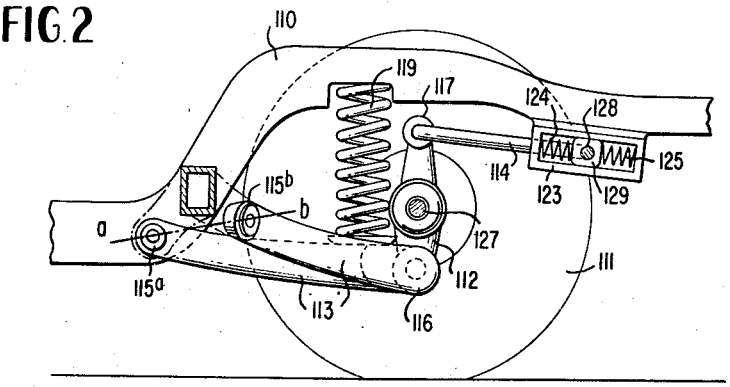
FIGURE 2 is a somewhat schematic, partial side elevational view, similar to FIGURE 1, of a modified embodiment of a wheel suspension in accordance with the present invention having a yieldingly arranged joint between the upper guide member and the vehicle superstructure and taken along line 2—2 of FIGURE 3.
Figure 3:
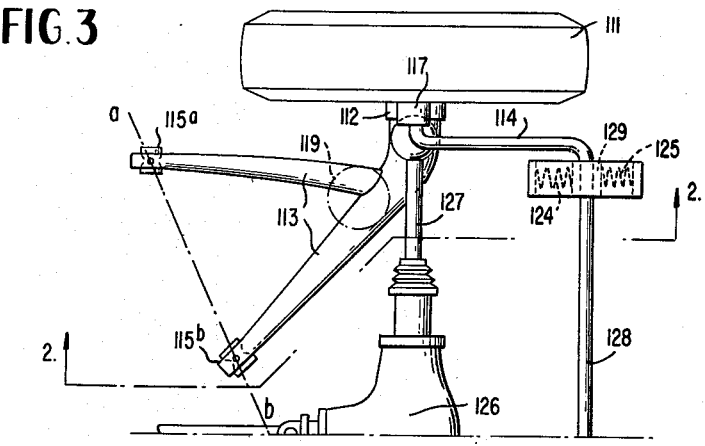
FIGURE 3 is a partial top plan view of the wheel suspension of FIGURE 2.

In the embodiment illustrated in FIGURES 2 and 3, the same parts are designated with the same reference numerals as in FIGURE 1, but utilizing the 100 series. In FIGURES 2 and 3, the lower guide member 113 is constructed in a fork-shaped manner and is pivotally supported by means of bearing eyes 115a and 115b on a wide base at the vehicle superstructure 110 about the axis a–b extending at an inclination to the vehicle longitudinal direction whereby the bearing support takes place preferably with the interposition of the rubber bushings. The wheel carrier 112 is again connected with the guide member 113 in an angle-stiff or corner-rigid manner as viewed in plan view. The wheels are driven, for example, by way of an axle gear 126 secured at the vehicle superstructure and one duble-jointed shaft 127 each.

A torsion rod stabilizer 128 forms simultaneously the upper guide member 114. The stabilizer 128 is, for this purpose, offset or cranked in the driving direction at its end sections and forms by means of its outwardly directed, bent end portions 117 the joint connecting the upper guide member and therewith also the stabilizer with the wheel carrier 112. The stabilizer 128 is supported thereby in a bearing joint 128 which, however, is not rigidly secured at the vehicle superstructure 110 but is slidingly supported relative thereto in the manner of a sliding shoe in the vehicle longitudinal direction within a sliding guide means 123 arranged at the vehicle superstructure 110. Springs 124 and 125 retain the bearing piece 129 and therewith the stabilizer 128 in a central position relative to the vehicle superstructure 110. Upon the occurrence of impacts and shocks acting in the vehicle longitudinal direction, the stabilizer 128 together with the upper guide member 114 may yield in relation to the vehicle superstructure in the driving direction or in the opposite direction in order to absorb the shocks and impacts softly prior to the transmission to the vehicle superstructure 110.

As to the remainder, the same applies in principle for the yieldingness of the bearing piece 129 and the springs 124 and 125 as for the yieldingness of the upper member 14 and the springs 24 and 25 of the embodiment according to FIGURE 1.

Figure 4:
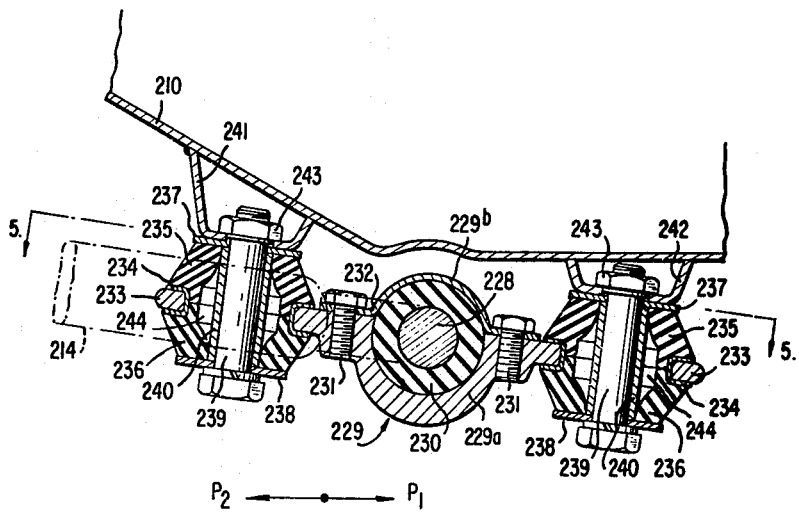
FIGURE 4 is a partial cross-sectional view, taken along line 4—4 of FIGURE 5, through one embodiment of a joint of the upper guide member in accordance with the present invention and arranged in the longitudinal direction of the vehicle.
Figure 5:
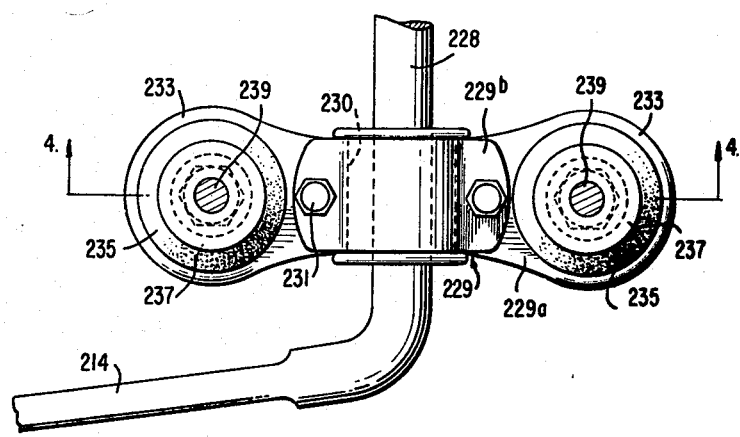
FIGURE 5 is a partial plan view on the joint of FIGURE 4, the cross section being taken along line 5—5 of FIGURE 4.

FIGURES 4 and 5 illustrate a constructional embodiment for a yielding support of a stabilizer serving simultaneously as upper guide member. The same parts are thereby designated again with the same reference numerals as in FIGURES 1 to 3, but utilizing the 200 series reference numerals.

The stabilizer 228 is supported in a bearing piece or assembly generally designated by reference numeral 229 with the interposition of a rubber bushing 230. The bearing piece 229 is of two-partite construction and includes a lower bearing part 229a and a cover-like, upper part 229b which is secured at the lower part 229a by means of screws or bolts 231. The separating joint 232 between the lower and upper parts is thereby disposed eccentrically to the center axis of the stabilizer 228, and more particularly is displaced toward the cover side so that the rubber bushing 230 is seized or retained securely in the lower part 229a and the forces occurring at the stabilizer 228 are reliably transmitted to the bearing lower part 229a.

The ends of the bearing piece 229, i.e., of the bearing lower part 229a terminate in the longitudinal direction on both sides of the stabilizer 228 in bearing eyes 233 whose axes extend approximately vertically or upright and are equipped with bushings 234 of U-shape in cross section. Rubber rings 235 and 236 are inserted into the bushings 234 which are constructed of truncated, conical shape and are supported in the axial direction, on the one hand, against one another or against the rings 234 and, on the other, against disks 237 and 238 which are each clamped against one another by means of a threaded bolt 239 with the interposition of a spacer bushing 240 and are clamped to or secured at bearing mounts 241 and 242 of the superstructure 210 by means of the nuts 243.

As is readily visible from the drawing, the rubber cushions 235 and 236 are supported in the radial direction at most at the ends thereof against securing bolts 239 or spacing bushings 240 while, as to the rest, they form a hollow space 244 so that in case of shocks and impacts in the direction of arrows $P_1$ and $P_2$, the stabilizer 228 can yield in relation to the vehicle superstructure 210 corresponding to the play assured by the hollow space 244 toward the rear or forwardly to a considerable extent, for example 10 to 15 mm. whereas the yieldingness in other directions is kept within limited boundaries, for example, corresponds approximately to the yieldingness of the rubber bushing 230 or is only slightly larger than the same.

Possibly the yieldingness in the directions $P_1$ and $P_2$ may also be differently large, for example, in such a manner that the shocks which are transmitted in the direction $P_1$ from the wheel axle to the vehicle superstructure, are absorbed more softly than the shocks acting in the opposite direction.

As can be seen from FIGURES 4 and 5, the guide members 214, i.e., the ends of the stabilizer 228 bent off in the forward direction and forming these guide members, have an upright, on-edge profile so that they yield in the lateral direction and are therefore able to follow the movements of the wheel carrier (12 or 112) determined by the lower guide member (corresponding to the guide members 13 and 113 of FIGURES 1 to 3), practically in a completely unconstrained manner in the lateral direction.

As to the rest, the same applies for the embodiment according to FIGURES 4 and 5 insofar as the remaining construction of the wheel suspensions is concerned as for the embodiments according to FIGURES 1, 2 and 3.

While I have shown and described several embodiments in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. A wheel suspension for the rear axle of motor vehicles, in which the wheel carrier means is guided at the vehicle superstructure by means of two substantially oppositely directed guide means, one of said guide means being operatively connected with the vehicle superstructure and with the wheel carrier means in a pivotal manner about a cross axis so as to be angle-stiff as viewed in plan view, the other guide means pivotally supporting the wheel carrier means with respect to the vehicle superstructure so as to provide universal movement, wherein the improvement comprises further means operatively associated with said other wheel guide means to provide a yieldingness primarily in the vehicle longitudinal direction, said further means including at least one cushion means freely deformable primarily in sheer in the vehicle longitudinal direction between its support surface at the vehicle superstructure and a support surface at the joint means of the wheel guide means and bearing means for said other wheel guide means providing elastic yieldingness, said bearing means being secured at the corresponding vehicle part by said cushion means, wherein the cushion means is constructed as an annularly shaped cushion having a ring axis extending substantially perpendicularly to the vehicle longitudinal direction, and being clamped at its ends to one of the two parts consisting of the vehicle superstructure and the other guide means and being clamped to the other of said two parts in the center area of the cushion means with free deformability between the clamping places thereof.

2. A wheel suspension according to claim 1, wherein said one wheel guide means is the lower wheel guide member and the other wheel guide means the upper wheel guide member of the wheel suspension.

3. A wheel suspension according to claim 1, wherein said corresponding part is the vehicle superstructure.

4. A wheel suspension according to claim 1, wherein one rubber-like cushion means each is arranged in front and to the rear of the bearing means.

5. A wheel suspension according to claim 1, wherein one rubber-like cushion means each is arranged in front and to the rear of the bearing means.

6. A wheel suspension according to claim 1, wherein the annularly shaped cushion means is secured at the vehicle superstructure by a securing bolt axially extending through the cushion means with radial play, said cushion means tightly surrounding at its axial ends the securing bolt whereas the center portion of said cushion means tightly surrounded by the bearing means is freely deformable in the radial direction in relation to the securing bolt.

7. A wheel suspension according to claim 6, wherein the transversely subdivided cushion means are inserted into the bearing eye means of the bearing means with the interposition of U-shaped reinforcing rings.

8. A wheel suspension for the rear axle of motor vehicles, in which the wheel carrier means is guided at the vehicle superstructure by means of two substantially oppositely directed guide means, one of said guide means being operatively connected with the vehicle superstructure and with the wheel carrier means in a pivotal manner about a cross axis so as to be angle-stiff as viewed in plan view, the other guide means pivotally supporting with respect to the vehicle superstructure so as to provide universal movement, wherein the improvement comprises further means operatively associated with said other wheel guide means to provide a yieldingness primarily in the vehicle longitudinal direction, said further means including a resilient cushion freely deformable primarily in sheer in the vehicle longitudinal direction between its support surface at the vehicle superstructure and a support surface at the joint means of the wheel guide means, the wheel guide means which is simultaneously constructed at least in part as a transversely extending torsion rod is supported at the vehicle superstructure in bearing means to provide a pivotal support, and said bearing means including bearing eye means in front and to the rear of the bearing axis of the guide means for the accommodation of annularly shaped elastic cushion means serving for the connection with the vehicle superstructure.

9. A wheel suspension according to claim 8, wherein said elastic cushion means have an axis substantially perpendicular to the bearing axis.

10. A wheel suspension according to claim 8, wherein the annularly shaped cushion means is secured at the vehicle superstructure by a securing bolt axially extending through the cushion means with radial play, said cushion means tightly surrounding at its axial ends the securing bolt whereas the center portion of said cushion means tightly surrounded by the bearing means is freely deformable in the radial direction in relation to the securing bolt.

11. A wheel suspension according to claim 10, wherein the transversely subdivided cushion means are inserted into the bearing eye means of the bearing means with the interposition of U-shaped reinforcing rings.

12. A wheel suspension according to claim 11, wherein said guide means is supported in the joint means by means of a rubber bushing.

13. A wheel suspension according to claim 11, wherein the longitudinally elastically yielding bearing means serving for the pivotal connection of the wheel guide means at the vehicle superstructure is subdivided in a bearing-dish-like manner to provide two bearing parts, the separating joint therebetween extending eccentrically to the bearing axis in such a manner that the part of the bearing means arranged at the vehicle superstructure, which has a large longitudinal yieldingness, surrounds the bearing bushing by more than 180° and the other part is placed on the first part in a cover-like manner.

14. A wheel suspension for the rear axle of motor vehicles, in which the wheel carrier means is guided at the vehicle superstructure by means of two substantially oppositely directed guide means, one of said guide means being operatively connected with the vehicle superstructure and with the wheel carrier means in a pivotal manner about a cross axis, the other guide means pivotally supporting the wheel carrier means with respect to the vehicle superstructure so as to provide universal movements, wherein the improvement comprises further means operatively associated with said other wheel guide means to provide a yieldingness primarily in the vehicle longitudinal direction, said further means including a resilient cushion freely deformable primarily in sheer in the vehicle longitudinal direction between its support surface at the vehicle superstructure and a support surface at the joint means of the other wheel guide means and also including a bearing means for said other wheel guide means providing the elastic yieldingness, the longitudinally elastically yielding bearing means serving for the pivotal connection of the other wheel guide means at the vehicle superstructure is subdivided in a bearing-dish-like manner to provide two bearing parts, the separating joint therebetween extending eccentrically to the bearing axis in such a manner that the part of the bearing means arranged at the vehicle superstructure, which has a large longitudinal yieldingness, surrounds the bearing bushing by more than 180° and the other part is placed on the first part in a cover-like manner.

15. A wheel suspension according to claim 14, wherein said guide means is also supported in the joint means by means of a rubber bushing.

16. A wheel suspension according to claim 1, wherein said other guide means is constituted by a torsion rod stabilizer.

17. A vehicle, comprising: a frame member; a wheel carrier member; a guide arm extending between said frame member and said wheel carrier member; means connecting one end of said guide arm to said frame member and means connecting the other end of said guide arm to said wheel carrier member; and one of said connecting means comprising two spaced and substantially parallel projections rigidly mounted on one of the elements consisting of said guide arm and one of said members, a pivot shaft drivingly connected to the other of the elements consisting of the one of said members and said guide arm, a substantially rigid bearing piece having means rotatably mounting therein said pivot shaft and having eyelets on each said of said pivot shaft respectively surrounding said projections forming respective annular spaces therebetween, and resilient cushion means forming the sole driving connection between said bearing piece and said one of said members, said cushion means being secured to each of said eyelets respectively leaving a free annular space between the respective eyelet and projection and extending axially into engagement with the respective projection.

18. A vehicle according to claim 17, wherein said bearing piece includes a single homogeneous plate forming said eyelets and having a central cradle portion receiving therein and extending more than 180° around said pivot shaft, and a cover extending over said cradle portion to completely surround said pivot shaft in cooperation with said cradle portion.

19. The vehicle according to claim 18, wherein said bearing piece further includes a resilient annular bushing between said pivot shaft and the remainder of said bearing piece.

20. The vehicle according to claim 17, wherein each of said cushion means is annular having its central portion connected to the respective eyelet and its opposite axial ends connected to the respective projection.

21. A vehicle, comprising: a vehicle superstructure; a wheel carrier member; a guide arm connected with the wheel carrier member; a bearing member rotatably mounting the guide arm about a transverse axis of the vehicle and having a support part oriented toward the front and a support part oriented toward the rear, with respect to the driving direction; elastic rubber-like material means disposed between the forward oriented support part and the vehicle superstructure; rubber-like elastic material means disposed between the rearward oriented support part and the vehicle superstructure; both of said means providing the connection of the bearing member, in the longitudinal direction of the vehicle, with the vehicle superstructure elastically so that the bearing member, together with the guide arm, elastically yield primarily in the longitudinal direction of the vehicle a substantial amount with respect to the vehicle superstructure.

22. A vehicle according to claim 21, wherein each of said rubber-like elastic material means includes a plurality of rings having a perpendicular axis and is provided on each side, respectively, of both the forward oriented support part and the rearward oriented support part.

23. A vehicle according to claim 22, wherein a rubber bushing having a horizontal axis located transversely with respect to the driving direction is disposed between said guide arm and said support parts.

References Cited
UNITED STATES PATENTS

| | | | |
|---|---|---|---|
| 3,277,975 | 10/1966 | Van Winsen | 280—124 |
| 2,811,214 | 10/1957 | Uhlenhaut | 180—73 |
| 2,226,047 | 12/1940 | Borgward | 180—73 |
| 3,229,783 | 1/1966 | Muller | 180—73 |
| 2,967,063 | 1/1961 | Mueller | 280—124 |
| 2,348,101 | 5/1944 | Appel | 267—1 |
| 3,235,244 | 2/1966 | Hein | 267—1 |

PHILIP GOODMAN, Primary Examiner